United States Patent [19]
Harle

[11] Patent Number: 5,211,918
[45] Date of Patent: May 18, 1993

[54] CATALYTIC CONVERTER FOR EXHAUST GASES

[75] Inventor: Hans A. Harle, Bopfingen, Fed. Rep. of Germany

[73] Assignee: Schwabische Huttenwerke, Fed. Rep. of Germany

[21] Appl. No.: 820,534

[22] Filed: Jan. 14, 1992

Related U.S. Application Data

[63] Continuation of Ser. No. 285,501, Dec. 16, 1988, abandoned.

[30] Foreign Application Priority Data

Dec. 22, 1987 [DE] Fed. Rep. of Germany ....... 3743503

[51] Int. Cl.$^5$ ............................................. B01D 53/36
[52] U.S. Cl. .................... 422/171; 422/180;
  55/320; 55/321; 55/485; 55/486; 55/DIG. 30;
  502/439; 502/527
[58] Field of Search ............... 422/171, 180, 320, 321;
  55/523, DIG. 30, 485, 486; 502/439, 527

[56] References Cited

U.S. PATENT DOCUMENTS

| | | |
|---|---|---|
| 2,267,918 | 12/1941 | Hildabolt . |
| 3,087,233 | 4/1963 | Turnbull . |
| 3,161,478 | 12/1964 | Chessin . |
| 3,306,353 | 2/1967 | Burne . |
| 3,810,732 | 5/1974 | Koch . |
| 3,904,551 | 9/1975 | Lundsager et al. . |
| 3,956,192 | 5/1976 | Nicolai . |
| 4,064,914 | 12/1977 | Grant . |
| 4,301,012 | 11/1981 | Puckett . |
| 4,329,162 | 5/1982 | Pitcher, Jr. . |
| 4,515,758 | 5/1985 | Domesle et al. . |
| 4,652,286 | 3/1987 | Kusuda et al. . |
| 4,662,915 | 5/1987 | Shirai et al. . |
| 4,687,579 | 8/1987 | Bergman . |
| 4,725,411 | 2/1988 | Cornelison . |
| 4,732,593 | 3/1988 | Kondo et al. . |
| 4,758,272 | 7/1988 | Pierotti et al. . |
| 4,760,047 | 7/1988 | Jeschke et al. . |
| 4,889,630 | 12/1989 | Reinhardt et al. . |
| 4,960,449 | 10/1990 | Yonushonis . |
| 4,971,769 | 11/1990 | Haerle . |
| 4,981,172 | 1/1991 | Haerle . |
| 4,983,193 | 1/1991 | Tani et al. . |
| 5,009,857 | 4/1991 | Haerle . |
| 5,059,326 | 10/1991 | Haerle . |

FOREIGN PATENT DOCUMENTS

| | | |
|---|---|---|
| 42301 | 12/1981 | European Pat. Off. . |
| 3901609 | 7/1990 | Fed. Rep. of Germany . |
| 3908581 | 9/1990 | Fed. Rep. of Germany . |
| 3937809 | 5/1991 | Fed. Rep. of Germany . |
| 1453653 | 9/1966 | France . |
| 2462188 | 2/1981 | France . |
| 54-128842 | 10/1979 | Japan . |
| 61-256113 | 11/1986 | Japan . |
| 61-287451 | 12/1986 | Japan . |
| 62-225221 | 10/1987 | Japan . |

Primary Examiner—Lynn M. Kummert
Attorney, Agent, or Firm—Welsh & Katz, Ltd.

[57] ABSTRACT

A process is disclosed for the production of an improved catalytic converter for the cleaning of exhaust gases from internal-combustion engines, which includes a catalytic converter body through which the exhaust gases flow. The catalytic converter body is compression-molded from metal wire pieces or metal chips and is sintered after molding.

5 Claims, 1 Drawing Sheet

5,211,918

CATALYTIC CONVERTER FOR EXHAUST GASES

This is a continuation of application Ser. No. 285,501, filed Dec. 16, 1988, now abandoned.

BACKGROUND OF THE INVENTION

The present invention relates to a process for the production of a catalytic converter for the cleaning of the exhaust gases produced by internal-combustion engines and, in particular, to a catalytic converter body through which the exhaust gases flow for catalytic conversion to less noxious gases. The present invention also relates to a catalytic converter body having improved structural characteristics.

Catalytic converters are being increasingly used in automotive engine technology to convert noxious exhaust gas components into harmless gases, with the intention being particularly directed to the reduction of the emission of carbon monoxide, hydrocarbons and nitrogen oxides from the engine. The principal components of such a catalytic converter assembly or cleaning unit are the catalytic converter carrier or converter body, its precious-metal catalytic coating, and a housing surrounding the catalytic converter body.

A honeycomb-like-structured ceramic cylinder with a circular or oval cross-section is generally used as a carrier for the catalytic converter. This type of unit has, until now, been the one which has met with the greatest success as compared to other carrier structures, such as, for example, porous beds of catalytic particles, and wound sheet-metal strips. The honeycomb character is created by a plurality of fine channels which run through the catalytic converter body in the direction of flow of the exhaust gases. The actual catalytic ingredient is normally coated on the surface of the catalytic converter body. Platinum, rhodium and palladium are primarily used as the catalytic constituent of the surface coating.

One problem which is difficult to overcome, in particular with the use of a catalytic converter body of ceramic, is its fracture-resistant mounting. This is due to the brittle nature of ceramic material. In this connection, the thin-walled honeycomb pattern of the catalytic converter body is extremely sensitive to vibrations, impact and other mechanical influences. Also to be taken into account are the exhaust gas flow impulses and the high exhaust gas temperatures, which may reach up to about 900° C.

To avoid the risk of fracture due to external influences or normal motions of the ceramic body, the body is held in a highly heat-resistant wire shrouding. The use of bypass seals insures that the exhaust gases will not leak around the ceramic block and through the wire network. The ceramic body and the wire shroud network are, in general, surrounded by a catalytic converter housing which has the additional task of protecting the sensitive ceramic body from rapid changes in temperature, e.g , due to external splashing of water, and mechanical impacts.

Due to the costly production method and the necessary secure packaging of the catalytic converter body, such a catalytic converter is relatively expensive.

Accordingly, it is an object of the present invention to provide a catalytic converter body which has improved physical strength.

It is a particular object of the present invention to provide a catalytic converter body having improved fracture resistance.

It is another object of the present invention to provide a catalytic converter body which can be fabricated by less costly techniques.

It is a further object of the present invention to provide a catalytic converter body which possesses a good, or even more improved, catalytic effect with a simple structure.

These and other objects of the invention, as well as advantages thereof, will become more clear from the disclosure which follows.

SUMMARY OF THE INVENTION

The foregoing objects are achieved by the provision of a catalytic converter body which is compression-molded from metal wire pieces or metal chips and sintered after molding to provide a unitary structure.

The production of diverse molded parts in powder metallurgy from metal powder is common knowledge. The powders used are compression-molded in cold or hot condition and subsequently sintered. By sintering is meant a heating in a reducing atmosphere to temperatures which lie in the level of ⅔ to 4/5 of the melting point of the metal powder used. In this process the metal surfaces bake together, with a simultaneous consolidation of the powder mixture Characteristics of a sintered body are its porosity and small expansion.

Surprisingly, it has now been found that in a molding and sintering of metal wire pieces and/or metal chips, parts with a very low density can be produced with a high material strength. In particular, it has been found that such sintered parts possess a high absorption power for gas infiltrations or for a flow-through. In addition, they exhibit, compared to other known materials, a significantly higher flowability around the surface. In an inventive way, it has now been determined that such a body can surprisingly and very advantageously be used as a catalytic converter body. In the process the body may, after sintering, have to be merely coated in the conventional manner with the actual catalytic material. If necessary, an intermediate layer (washcoat) can conventionally be applied to enlarge the effective surface, after which the body can be covered with the catalytic precious metals, such as platinum and rhodium.

It is, however, also within the scope of the present invention to produce the sintered body itself from a material which exhibits catalytic properties. In this case, the subsequent coating with a catalytic material can be omitted.

A more clear understanding of the present invention may be obtained from the discussion which follows, when read in light of the drawing Figure.

DESCRIPTION OF THE PREFERRED EMBODIMENTS

It has now been found that with the process according to the present invention, a catalytic converter body with very good catalytic effect is created by compression molding a converter body from a plurality of metal pieces and then sintering the molded metal pieces to provide a unitary structure.

Figure 1:
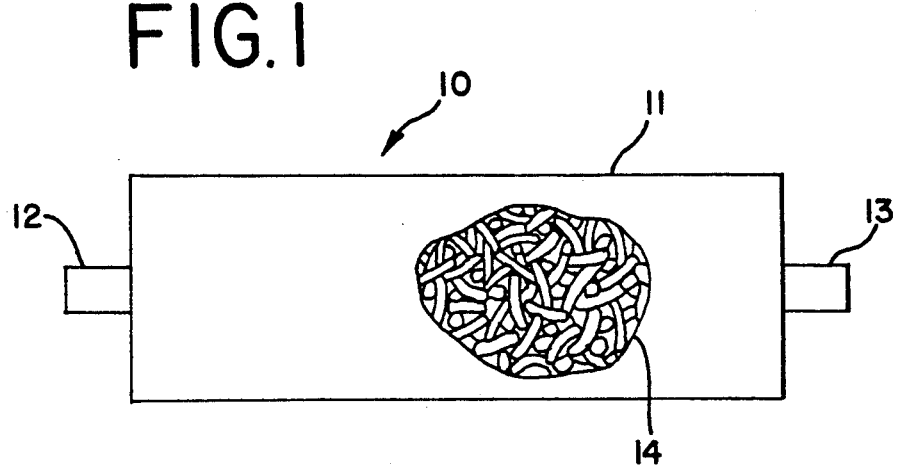
FIG. 1 is a side elevational view of a catalytic converter assembly according to the present invention.

Referring to FIG. 1, there is shown a catalytic converter assembly 10 which comprises a housing 11 having an inlet coupling 12 and an outlet coupling 13. Inlet coupling 12 is typically connected to the cross-over pipe (not shown) which conveys exhaust gases from an internal combustion engine exhaust manifold. Outlet coupling 13 is typically connected to an exhaust pipe (not shown) which conveys catalytically converted gases to the engine muffler. Housing 11 typically has a circular or an oval cross-section. Housing 11 is shown partially cut-away to expose a catalytic converter body 14 which is fabricated of metal wire pieces or metal chips which have been compression molded and sintered to provide a porous body. Catalytic converter body 14 typically has the shape of a circular cylinder or an elliptical cylinder.

With the catalytic converter body according to the present invention, a further disadvantage with the known catalytic converters is also largely reduced. As is generally known, due to the installation of a catalytic converter and the ensuing flow resistance or back pressure, a reduction in the power of the internal-combustion engine must be accepted, which applies particularly to full-load operation. The catalytic converter body according to the present invention produces a lower flow resistance, which thus exerts a positive influence on the power of the internal-combustion engine.

The flow resistance can also be controlled or further reduced by a splitting of the catalytic converter body into a plurality of molded segments arranged one after the other. As is generally known, the flow resistance or pressure drop increases over the length of the catalytic converter body. If one now uses, in a further embodiment according to the invention, a plurality of molded segments arranged one after the other and contacting one another, with their density decreasing in the direction of flow of the exhaust gas, the flow resistance can be reduced even more effectively. By the production process according to the present invention, such molded segments of differing density, which are then combined accordingly, can be produced without any difficulty.

Figure 2:
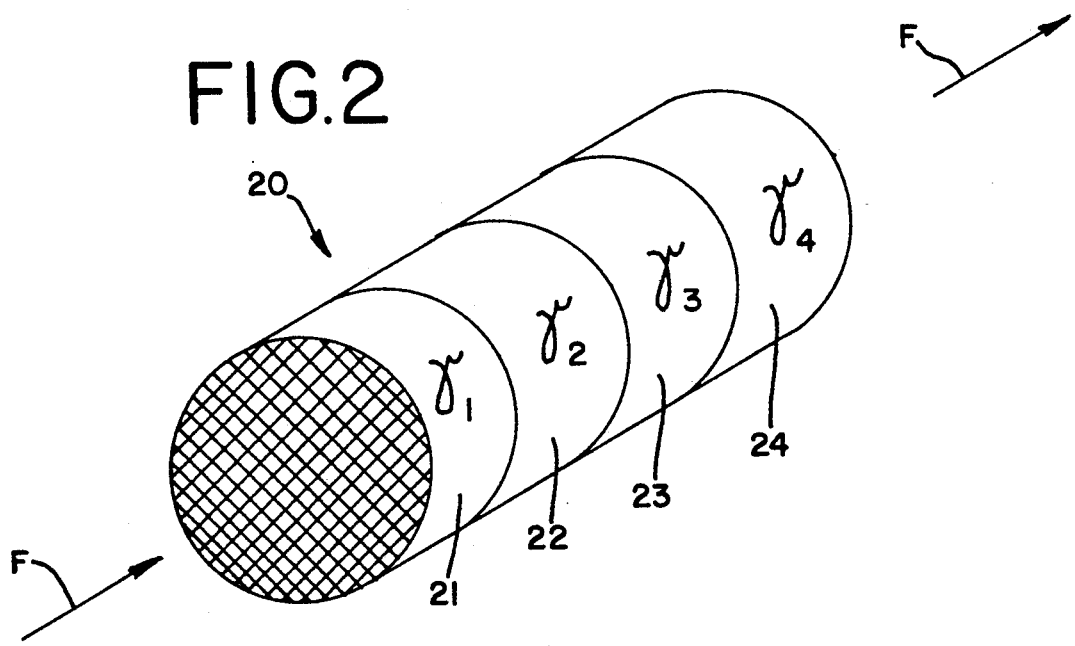
FIG. 2 is a perspective view of an embodiment of the present invention which comprises a plurality of catalytic converter body segments.

Referring now to FIG. 2, a catalytic converter body 20 according to the invention is shown. The catalytic converter body is produced by compression molding metal wire pieces or metal chips and subsequently sintering the structure, with the shape being selected so that a cylindrical form is created for the catalytic converter body 20. To reduce the flow resistance, the catalytic converter body 20 is formed from a plurality of cylinder segments 21, 22, 23 and 24 arranged one after the other. The aligned individual molded segments are pressed close to one another and their density $\gamma$ decreases sequentially in the direction of flow F from $\gamma_1$ to $\gamma_4$. Thus, $\gamma_1 > \gamma_2 > \gamma_3 < \gamma_4$.

Since the catalytic converter body according to the invention is not susceptible to fracture, the catalytic converter assembly itself can be made simpler in structure. Thus no flexible mounting is necessary and, as the case may be, even the protective tube or housing may be eliminated.

In regard to the sizes for the metal wire pieces used in fabricating the inventive converter body, diameters or widths of about 0.1–5 mm. and lengths of 0.5–30 mm. are preferred. However, the length is generally always distinctly greater than the width or diameter of the wire piece.

As the basic material of fabrication for the converter body, metal chips can be used instead of short metal wire pieces. These are obtained, for example, by punching, turning, planing or milling in widths of 1–5 mm. and lengths of 1–20 mm., and preferably in widths of 2–3 mm. and lengths of 5–10 mm. The width may also vary along the length of the metal chip according to the form of cutting operation which produced the chip.

Materials for the metal wire pieces or metal chips may be selected from the most varied of substances, with care solely having to be taken that these metals are resistant to the high temperatures which are to be expected during operation. Thus, for example, ferritic and austenitic steel, special alloys and the like are suitable. Alternatively, as noted hereinabove, the metal wire pieces or metal chips may be selected from the catalytic metals themselves, such as platinum, rhodium and palladium.

In light of the foregoing disclosure, further alternative embodiments of the inventive catalytic converter will undoubtedly suggest themselves to those skilled in the art. It is thus intended that the disclosure be taken as illustrative only, and that it not be construed in any limiting sense. Modifications and variations may be resorted to without departing from the spirit and the scope of this invention, and such modifications and variations are considered to be within the purview and the scope of the amended claims.

The invention claimed:

1. A catalytic converter assembly, suitable for cleaning the exhaust gases from an internal combustion engine, which comprises housing means, having exhaust gas entry means and exhaust gas exit means, said housing means including a catalytic body formed from a plurality of separate catalytic converter modules, each module having an inlet and outlet for the entrance and exit of said exhaust gases, each module being pressed up against adjacent modules for the flow of said exhaust gases therethrough and said modules being of different densities and arranged in order of decreasing density in a direction from said gas entry means to said gas exit means, each module having a unitary structure of compression molded and sintered metal pieces coated with a catalytic material having activity for cleaning exhaust gases from an internal combustion engine.

2. A catalytic converter assembly according to claim 1 wherein said catalytic converter modules further comprise metal chips.

3. A catalytic converter assembly according to claim 1 wherein said catalytic converter modules comprise metal wire pieces having a width of from 0.1 mm. to about 5 mm. and a length of from about 0.5 mm. to about 30 mm.

4. A catalytic converter assembly according to claim 1 wherein said catalytic converter modules comprise metal chips having a width of from about 1 mm. to about 5 mm. and a length of from about 1 mm. to about 20 mm.

5. A catalytic converter assembly according to claim 1 wherein said catalytic converter modules comprise compression molded and sintered metal pieces having a width of from about 1 mm. to about 3 mm. and a length of from about 2 mm. to about 10 mm.

* * * * *